US007228953B2

(12) United States Patent
Perreault et al.

(10) Patent No.: US 7,228,953 B2
(45) Date of Patent: Jun. 12, 2007

(54) ARTICLE FEEDER AND SPACER

(75) Inventors: Réal Perreault, St-Augustin-de-Desmaures (CA); David Sullivan, St-Étienne-de-Lauzon (CA); Gérald Duclos, St-Narcisse-de-Beaurivage (CA)

(73) Assignee: Conception R.P. Inc., Quebec (CA)

( * ) Notice: Subject to any disclaimer, the term of this patent is extended or adjusted under 35 U.S.C. 154(b) by 0 days.

(21) Appl. No.: 11/117,371

(22) Filed: Apr. 29, 2005

(65) Prior Publication Data
US 2006/0243561 A1    Nov. 2, 2006

(51) Int. Cl.
B65G 47/24    (2006.01)
(52) U.S. Cl. ...................... 198/392; 198/450
(58) Field of Classification Search ............... 198/443, 198/450, 392, 397.05, 444
See application file for complete search history.

(56) References Cited

U.S. PATENT DOCUMENTS

| 2,941,651 | A |   | 6/1960  | Hutter et al. |         |
|-----------|---|---|---------|---------------|---------|
| 3,054,497 | A |   | 9/1962  | Davis et al.  |         |
| 3,224,554 | A | * | 12/1965 | Moulder et al.| 198/392 |
| 3,625,337 | A | * | 12/1971 | Seragnoli     | 198/450 |
| 3,827,545 | A |   | 8/1974  | Buhoyar       |         |
| 3,830,355 | A |   | 8/1974  | Varjux        |         |
| 3,901,375 | A |   | 8/1975  | Raque         |         |
| 4,150,520 | A | * | 4/1979  | Palmieri et al.| 198/450|
| 4,355,712 | A |   | 10/1982 | Bruno         |         |
| 4,369,875 | A |   | 1/1983  | Schmitz       |         |
| 4,610,345 | A |   | 9/1986  | Spreen et al. |         |
| 4,830,172 | A |   | 5/1989  | Hilton et al. |         |
| 5,044,487 | A |   | 9/1991  | Spatafora et al.|       |
| 5,065,852 | A |   | 11/1991 | Marti         |         |
| 5,248,025 | A | * | 9/1993  | Neu           | 198/392 |
| 5,372,236 | A | * | 12/1994 | Layer         | 198/392 |
| 5,443,149 | A |   | 8/1995  | Rohwetter et al.|       |
| 5,474,493 | A | * | 12/1995 | Tolbert       | 198/392 |
| 5,740,899 | A |   | 4/1998  | Pugh et al.   |         |
| 5,863,177 | A | * | 1/1999  | Carson et al. | 198/392 |
| 6,161,676 | A |   | 12/2000 | Takahashi et al.|       |
| 6,578,699 | B2|   | 6/2003  | Baird et al.  |         |
| 6,763,931 | B1|   | 7/2004  | Brehm         |         |
| 2004/0050658 | A1 |  | 3/2004 | Johansson    |         |

OTHER PUBLICATIONS

Auburn Short Stock Automatic Stacking System, www.auburnmachinery.com/ssstacker.htm.
Logging & Sawmilling Journal, Nov. 1999, www.forestnet.com/archives/Nov_99/tech_update.htm.
Short Wood Systems Inc., www.shortwood.com/singulator.asp.
Gem-O-Wane Wane Up System, Gemofor, www.gemofor.qc.ca/pdf/waneup.pdf.

* cited by examiner

Primary Examiner—James R. Bidwell
(74) Attorney, Agent, or Firm—Ogilvy Renault, LLP

(57) ABSTRACT

A feeder for orienting and aligning disorderly incoming articles includes a table having a peripheral wall, a rotary surface surrounded by the peripheral wall, and a discharge substantially tangential to the peripheral wall, the discharge being sized to receive one article at a time from the rotary surface in a predetermined orientation; and at least one pile eliminating member extending above the rotary surface and defining a gap with the rotary surface, the gap being sized to solely permit passage of non-superposed articles laying in the predetermined orientation on the rotary surface. It also relates to a method for doing same and a method and an apparatus for removing obstructing blocks from the discharge.

25 Claims, 13 Drawing Sheets

ARTICLE FEEDER AND SPACER

CROSS-REFERENCE TO RELATED APPLICATIONS

This application is related to U.S. patent application Ser. No. 11/117,368 filed on Apr. 29, 2005.

BACKGROUND OF THE INVENTION

1) Field of the Invention

The invention relates to a feeder for orienting items from a disorderly block supply and, more particularly, it relates to a feeder having a rotary table and an apparatus for breaking up superposition of items on the rotary table and mechanisms for unjamming the block discharge.

2) Description of the Prior Art

Rotary disk feeders are commonly used for orienting and aligning items from a disorderly bulk supply, mainly in the food industry (See for instance U.S. Pat. No. 3,224,554; U.S. Pat. No. 5,044,487; and U.S. Pat. No. 5,065,852). Typically they include a disk turning about its axis and are designed to receive the product to be aligned in bulk. The rotary disk is surrounded by a peripheral wall which has a discharge aperture substantially tangential to the peripheral wall. The items oriented and aligned are discharged through the discharge aperture in a single file.

These rotary tables perform well for uniformly sized and mostly short and uniform length items. However, the performance of these rotary tables with blocks having different lengths and/or with relative long items are often inadequate. Several problems typically occur such as blocks wedging at the discharge because the items are pilled on top of each other or are not tangent to the peripheral wall.

These problems often occur in the wood industries where wood blocks need to be aligned and oriented for feeding wood working machines such as finger jointers or scanning equipment, for instance.

Some methods have been tried to prevent the obstruction such as wipers or deflectors to wipe off any portion of the items that exceeds the thickness of the items being processed. However, these methods are inefficient for long items and items having a length dispersion, i.e. having non-uniform or random lengths.

Moreover, for some applications, it is desirable to have a predetermined spacing between two consecutive aligned and oriented blocks.

SUMMARY OF THE INVENTION

It is an object of the invention to provide a feeder for aligning and orienting while reducing the obstruction of the discharge aperture of the feeder.

It is another object of the invention to provide a feeder having at least one automated method for dislodging obstructing blocks from the discharge aperture of the feeder.

It is a further object of the invention to provide a feeder in combination with a block spacer adapted to feed items with a spacing between two consecutive blocks and/or at a predetermined rate.

One object of the invention provides a feeder for orienting and aligning disorderly incoming articles. The feeder comprises: a table having a peripheral wall, a rotary surface surrounded by the peripheral wall, and a discharge substantially tangential to the peripheral wall, the discharge being sized to receive one article at a time from the rotary surface in a predetermined orientation; and at least one pile eliminating member extending above the rotary surface and defining a gap therewith, the gap being sized to solely permit passage of non-superposed articles laying in the predetermined orientation on the rotary surface. The pile eliminating member can be a longitudinal brush conveyor with bristles extending above the rotary surface, having a rotation axis substantially parallel to the rotary surface, and being rotatable in a direction bringing the articles towards the center of the rotary surface, away from the peripheral wall.

Another object of the invention provides a method for orienting and aligning disorderly incoming articles. The method comprises: feeding a rotary surface with the articles; driving the rotary surface to carry the articles to a discharge aperture defined in a peripheral wall surrounding the rotary surface, the discharge aperture being configured to only permit passage of one properly oriented article at a time; eliminating article piles or superposition on the rotary surface proximate to the peripheral wall; and individually withdrawing properly oriented articles from the rotary surface through the discharge aperture.

Another object of the invention provides a feeder for aligning and orienting disorderly incoming items. The feeder comprises: a table having a peripheral wall, a rotary surface surrounded by the peripheral wall, and a discharge substantially tangential to the peripheral wall, the discharge being sized to receive one item at a time and in a predetermined orientation; and at least one a dislodging arm disposed proximate to the discharge, the dislodging arm being movable between a retracted position and an extended position, the dislodging arm, when deployed to the extended position thereof, dislodging obstructing items from the discharge and pushing the items towards the center of the rotary surface, away from the discharge, thereby permitting oriented items to be received in the discharge to be withdrawn from the table.

Another object of the invention provides a method for orienting and aligning disorderly incoming items, comprising: feeding a rotary surface having a first rotation direction with the items; driving the rotary surface in rotation; aligning the items substantially tangential to a wall disposed at the periphery of the rotary surface; withdrawing the items aligned in a predetermined orientation from the rotary surface through a discharge aperture in the peripheral wall; detecting a presence of an item in the discharge aperture; calculating a duration of the presence of the item at a predetermined location; comparing the duration to a threshold duration wherein the threshold duration is a maximum time of the presence of the item at the predetermined location and after which the item is considered as obstructing the discharge aperture; and extending an extendable arm through the discharge aperture, if the calculated duration is longer than the threshold duration, the extendable arm in the extended position abutting the item obstructing the discharge aperture and pushing the item towards the center of the rotary surface, away from the discharge aperture.

Another object of the invention provides a feeder for orienting and aligning disorderly incoming articles in combination with an article spacer for spacing the aligned and oriented articles. The feeder comprises: a table having a peripheral wall, a rotary surface surrounded by the peripheral wall, and a discharge substantially tangential to the peripheral wall, the discharge being sized to receive one article at a time from the rotary surface in a predetermined orientation; and a first carrier disposed proximate to the discharge, the first carrier withdrawing, from the rotary surface, the articles introduced into the discharge, the first carrier cooperating with the article spacer to provide a distance between two consecutive articles withdrawn from the feeder.

Another object of the invention provides an apparatus for aligning and spacing items. The apparatus comprises: a rotatable table having a peripheral wall and a discharge opening in the peripheral wall, the discharge opening allowing the items in a predetermined orientation to be successively withdrawn from the rotatable table in a single file line, the rotatable table being fed with disorderly items; a first carrier disposed proximate to the discharge opening, the first carrier recovering the oriented items exiting through the discharge opening; and an item spacer mounted proximate to the first carrier, the item spacer providing a predetermined spacing between two consecutive oriented items.

A further object of the invention provides a method for aligning and spacing items. The method comprises: feeding a rotary surface with the items; driving the rotary surface in rotation; aligning the items substantially tangential to a wall disposed at the periphery of the rotary surface; withdrawing the items aligned in a predetermined orientation from the rotary surface through a discharge aperture in the peripheral wall; carrying the items withdrawn from the discharge aperture on a first carrier; and providing a spacing between two consecutive items withdrawn from the discharge aperture and carried by the first carrier.

A further aspect of the invention provides a feeder for orienting and aligning disorderly incoming articles. The feeder comprises: a table having a peripheral wall, a rotary surface surrounded by the peripheral wall, and a discharge substantially tangential to the peripheral wall, the discharge being sized to receive one article at a time from the rotary surface in a predetermined orientation; at least one pile eliminating member extending above the rotary surface and defining a gap therewith, the gap being sized to solely permit passage of non-superposed articles; and a rotary misaligned article eliminating member disposed over the rotary surface, spaced from the peripheral wall by a distance sufficient to permit only articles in the predetermined orientation to circulate therebetween, and rotatable in a direction dislodging the articles not in the predetermined orientation.

Another aspect of the invention provides a method for orienting and aligning disorderly incoming articles. The method comprises: feeding a rotary surface with the articles; driving the rotary surface to carry the articles to a discharge aperture defined in a peripheral wall surrounding the rotary surface, the discharge aperture being configured to only permit passage of one properly oriented article at a time; eliminating article piles on the rotary surface proximate to the peripheral wall; displacing with a rotary misaligned article eliminating member, spaced apart from the peripheral wall, articles not in the predetermined orientation towards the center of the rotary surface, away from the peripheral wall; and individually withdrawing properly oriented articles from the rotary surface through the discharge aperture.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
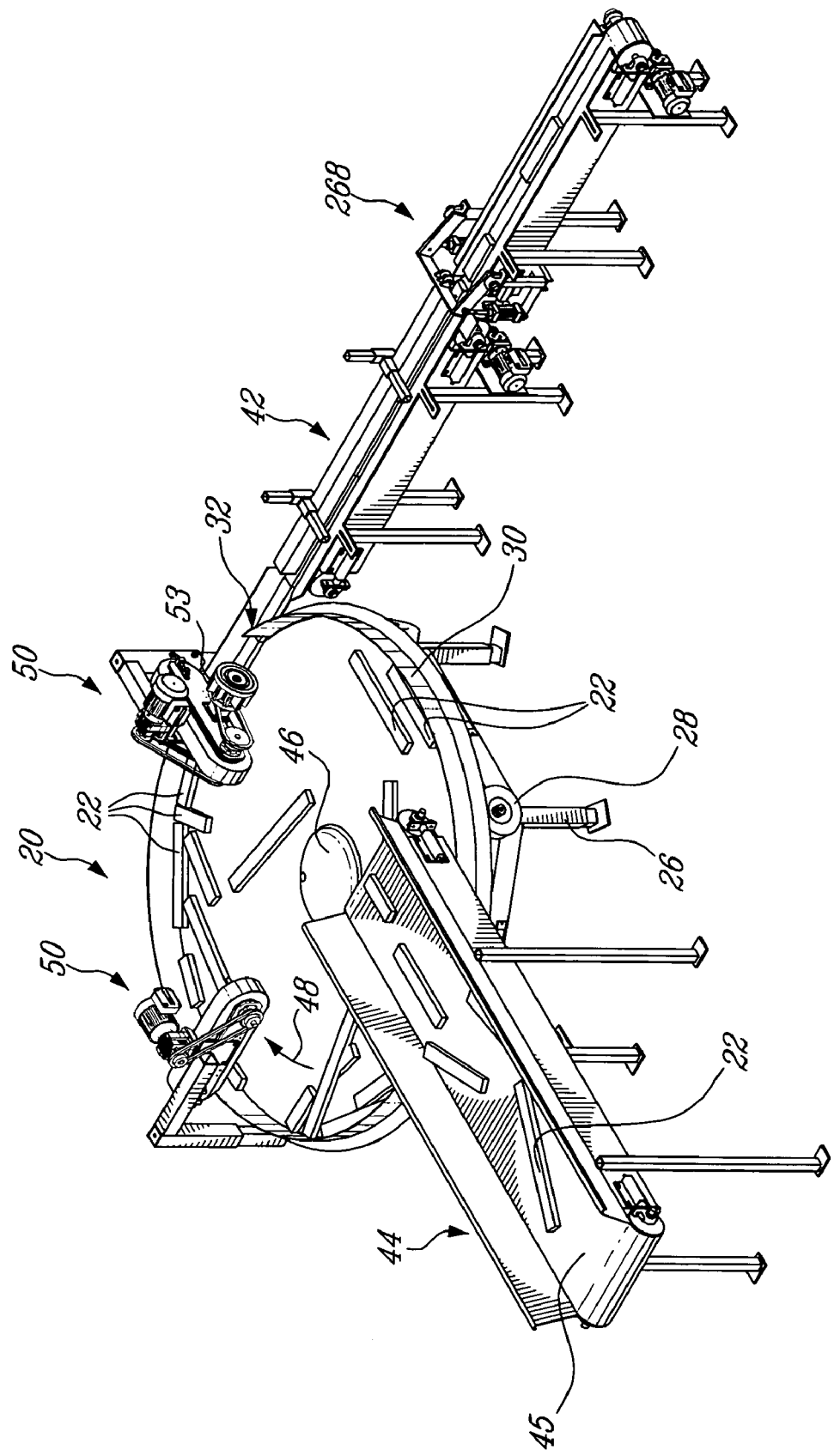
FIG. 1 is a perspective view of a feeder followed by a block spacer in accordance with an embodiment of the invention.
Figure 2:
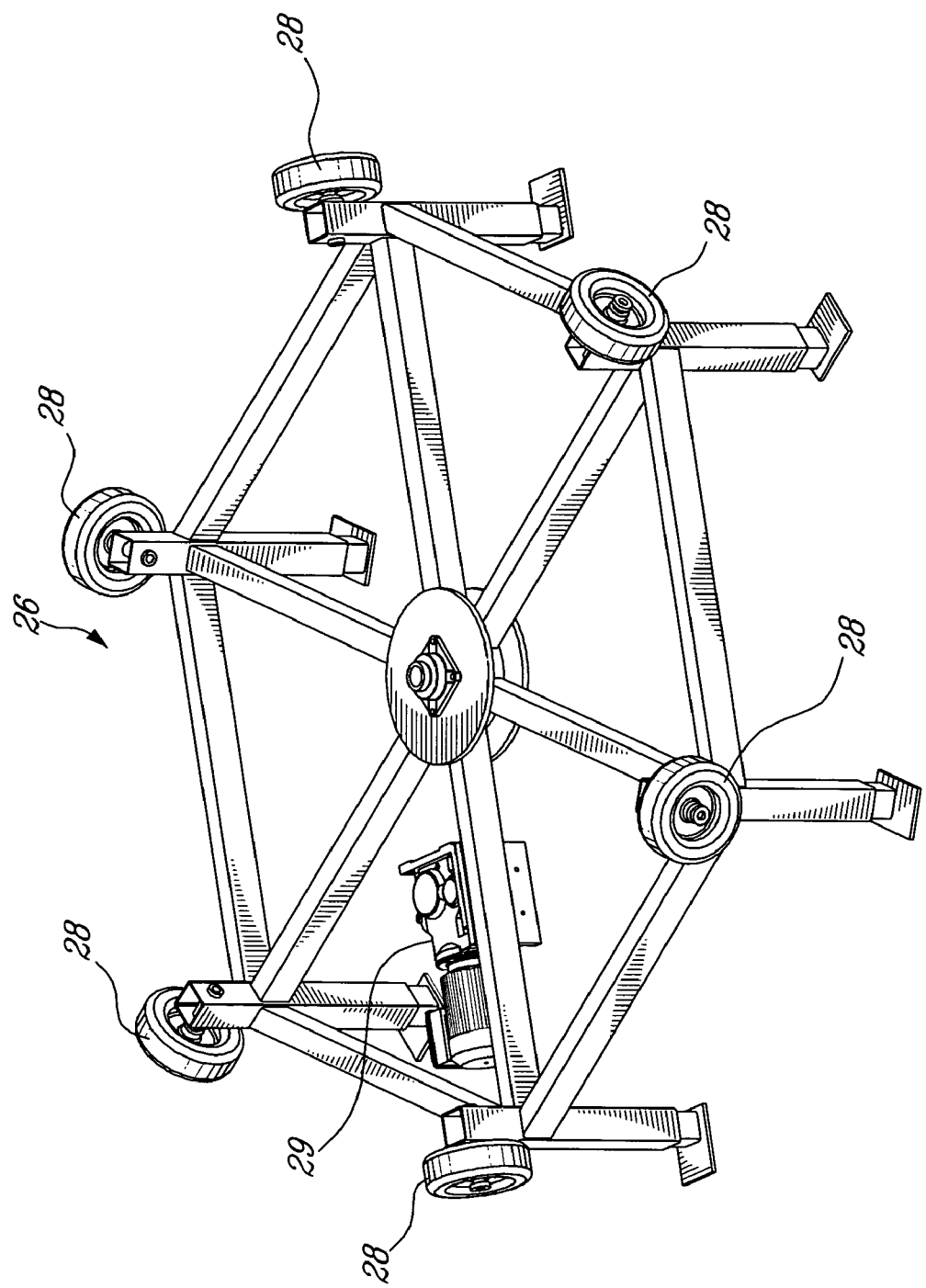
FIG. 2 is a perspective view of a frame for supporting a rotary surface in accordance with an embodiment of the invention.

Referring now to the drawings and, more particularly, to FIG. 1, there is shown a disk singulator, a feeder or a feeding apparatus for aligning and orienting blocks 22. According to one embodiment of the present invention, the feeder is provided in the form of a turn table or rotary table 20. The rotary table 20 includes a frame 26 with supporting wheels 28 disposed at the periphery of the frame 26 and on which a rotary surface 24 is rotatably disposed. Referring now to FIG. 2, it will be seen that the frame 26 includes an actuator 29, such as a gear motor, operatively connected to the rotary surface 24 for rotating the latter. One skilled in the art will appreciate that various types of actuators could be used to drive the rotary surface 24. For instance, it is contemplated to use an hydraulic motor. The rotary surface 24 is fed with the blocks 22, as will be described in more details below.

Referring back to FIG. 1, there is shown that the rotary surface 24 is surrounded by a peripheral wall 30, which is fixedly mounted to the frame 26. By rotating, the rotary surface 24, the blocks 22 are transferred towards the peripheral wall 30 by centrifugal force. The peripheral wall 30 guides the blocks 22 towards a discharge aperture 32, or block discharge. The shape and size of the discharge aperture 32 permits only correctly oriented blocks 22 to pass one at a time therethrough, or one block in a predetermined orientation.

A disorderly block feeder 44, such as a conveyor 45 or any other means known by those skilled in the art, feeds the rotary table 20 with the blocks 22. The disorderly block feeder 44 extends above the rotary surface 24. The blocks 22 are fed randomly on the rotary table 20.

The rotary surface 24 is preferably substantially flat but it can also include a conical central member 46 for facilitating the transfer of the blocks 22 towards the peripheral wall 30, especially when the rotary surface diameter is relatively important (typically above eight (8) feet).

The rotary surface 24 can preferably be rotated in both directions, as will be described in more details below. However, for aligning and orienting the blocks 22, the rotary surface 24 is rotated in the direction of the discharge aperture 32, represented by arrow 48.

Figure 3:
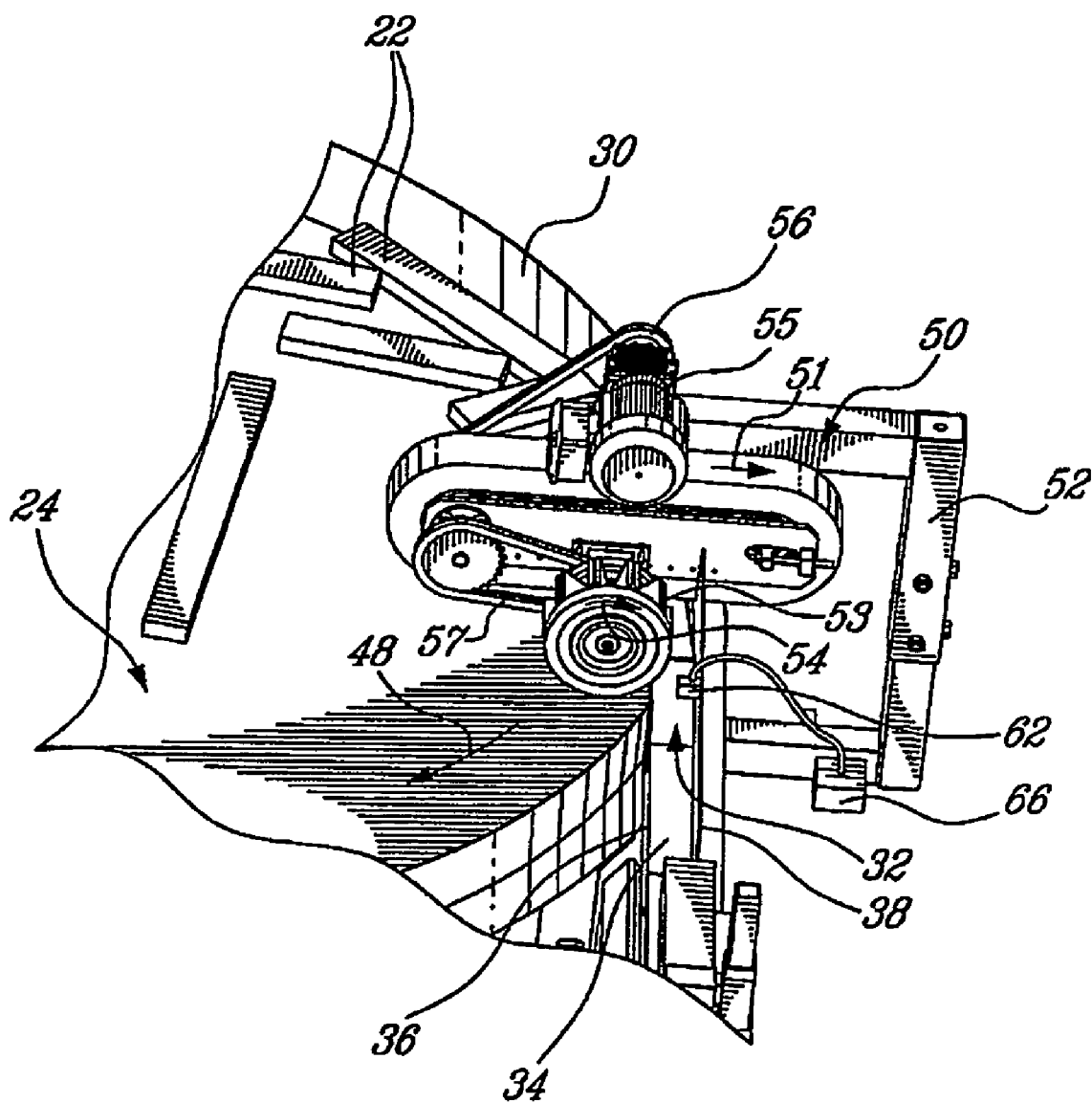
FIG. 3 is a perspective view, fragmented and enlarged, of a discharge aperture of the feeder shown in FIG. 1.

Referring now to FIG. 3, it will be seen that the discharge aperture 32 is substantially tangential to the peripheral wall 30 for withdrawing only the blocks 22 oriented substantially tangential to the peripheral wall 30. A discharge track 34 is juxtaposed to the discharge aperture 32 for supporting the blocks 22 withdrawn from the rotary surface 24. Inner and outer guide members 36, 38 are mounted on each side of the discharge track 34 for guiding the blocks 22. The outer guide member 38 is contiguous and tangential to the peripheral wall 30 on a first side of the discharge aperture 32. The inner guide member 36 is juxtaposed to the peripheral wall 30 on the opposite side of the discharge aperture 32. The discharge track 34 is followed by a first conveyor 42 (FIG. 1), as will be described in more details below.

For clarity, the blocks 22 will be characterized by a length, a width, and a thickness. The width of the blocks 22 corresponds substantially to the width (or size) of the discharge aperture 32. When the blocks 22 are withdrawn from the rotary table 20 in the predetermined orientation, the width of the blocks 22 is substantially parallel to the rotary surface 24, i.e. one face of the block 22 lays on the rotary surface 24. The thickness of the blocks 22 corresponds to the vertically extending dimension when the blocks are withdrawn from the rotary table 20. The length of the blocks 22 is the remaining dimension and corresponds to the dimension parallel to the first conveyor 42 when the blocks 22 are disposed thereon. For blocks 22, the length is the longest dimension. The thickness is typically the shortest dimension.

Figure 4:
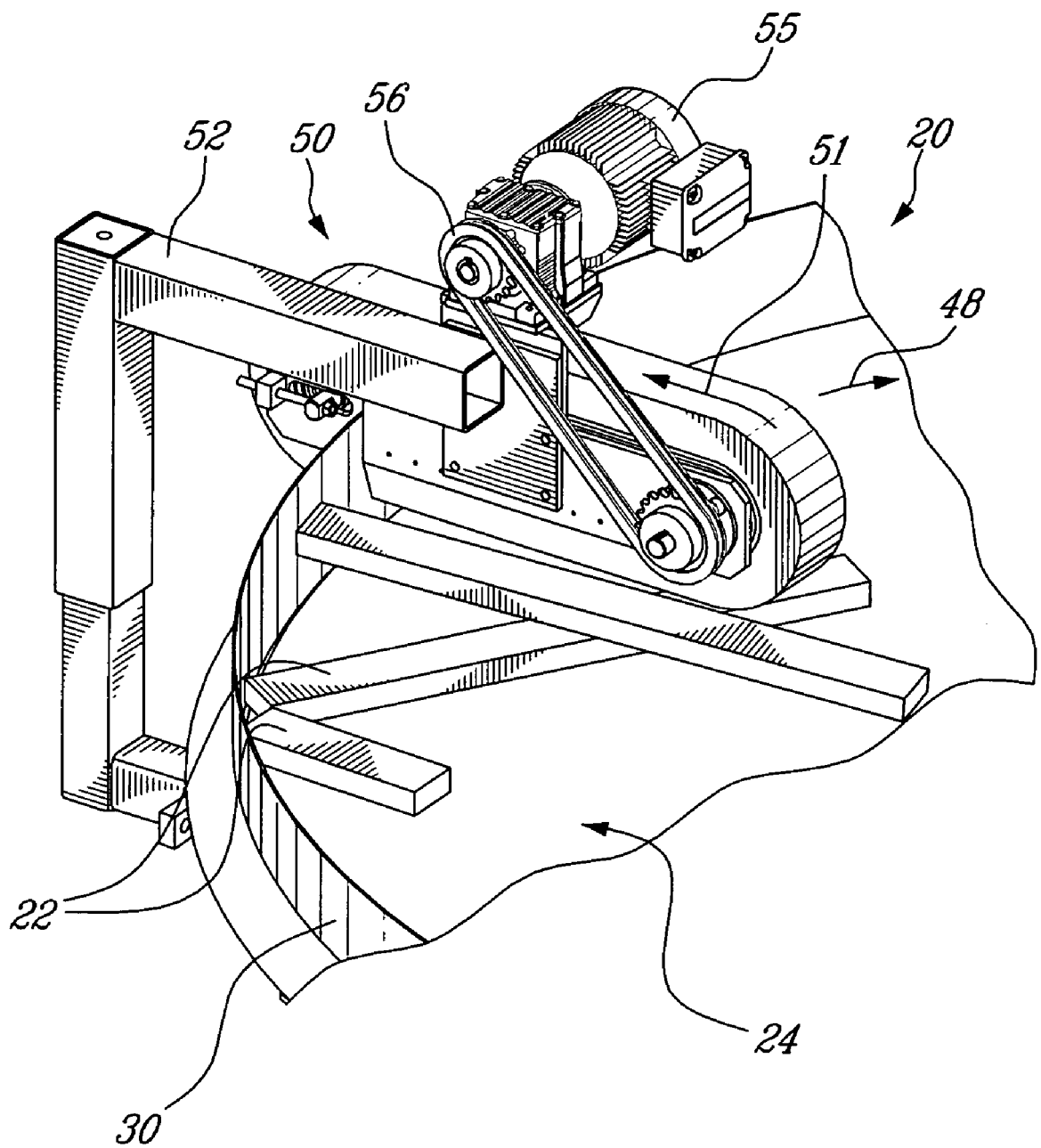
FIG. 4 is a perspective view, fragmented and enlarged, of a longitudinal brush conveyor extending over the rotary surface in accordance with an embodiment of the invention.

Referring to FIGS. 1, 2, and 4, it will be seen that the rotary table 20 also includes two overhead longitudinal brush conveyors 50 for eliminating block piles (FIG. 4) and reducing the probabilities of obstruction of the discharge aperture 32. The brush conveyors 50 extend from the peripheral wall 30 above the rotary surface 24. The brush conveyors 50 include an endless belt covered with bristles sufficiently stiff for moving the blocks 22. The brush conveyors 50 preferably rotate in a direction for bringing the blocks 22 towards the center of the rotary table 20, represented by arrow 51 (FIG. 3). One skilled in the art will appreciate that the rotary table 20 can include one or more longitudinal brush conveyors 50. The brush conveyors 50 are disposed over the rotary surface 24 at a distance, or a gap, allowing only non-superposed blocks 22 to circulate between the brush conveyor 50 and the rotary surface 24 in the orientation wherein the width of the block 22 is substantially parallel to the rotary surface 24, i.e. the face of the block 22 is in contact with the rotary surface 24. The distance between the brush conveyor 50 and the rotary surface 24 is preferably adjustable in accordance with the thickness of the blocks 22 being aligned and oriented. The gap between the brush conveyor 50 and the rotary surface 24 can also be adjusted to flip the blocks 22 that do not have their face in contact with the rotary surface 24.

As shown in FIG. 3, the brush conveyors 50 can be mounted to the frame 26 with L-shape supports 52 or any other appropriate supports.

Referring to FIGS. 1 and 3, it will be seen that the rotary table 20 can also include a rotary brush 53 that moves the blocks 22, which are not adequately aligned with the discharge aperture 32 and in the predetermined orientation or not enough proximate to the peripheral wall 30 away from the peripheral wall 30 to reduce the probabilities of obstruction of the discharge aperture 32. The rotary brush 53 preferably rotates in the direction of arrow 54 for propulsing away from the peripheral wall 30 the misaligned blocks 22.

The rotation axis of the rotary brush 53 shown in FIG. 3 is substantially horizontal and parallel to the rotary surface 24. One skilled in the art will appreciate that the rotation axis of the rotary brush 53 can also be in a substantially vertical orientation or any other orientation.

The rotary brush 53 is mounted over the rotary surface 24 at a distance shorter than the thickness of the blocks 22, proximate to the discharge aperture 32, upstream therefrom. The rotary brush 53 is preferably mounted over the rotary surface 24 at a distance from the peripheral wall 30 allowing the blocks 22 in the predetermined orientation to pass between the rotary brush 53 and the peripheral wall 30. The misaligned blocks 22 are moved away or displaced by the rotary brush 53 which pushes them away from the discharge aperture 32 towards the center of the rotary surface 24.

The brush conveyors 50 are operatively connected to an actuator 55, such as an electric motor, with a chain and sprocket assembly 56. The rotary brush 53 mounted proximate to the discharge aperture 32 can be operatively connected to the brush conveyors 50 mounted proximate thereto with a second chain and sprocket assembly 57. One skilled in the art will appreciate that other means can be used to transfer the motion between the actuator 55 and the brush conveyor 50 or between the brush conveyor 50 and the rotary brush 53 such as, without being limitative, a belt and pulley assembly.

One skilled in the art will appreciate that the brush conveyors 50 can be replaced by any block pile eliminating member extending above the rotary surface at a distance allowing one block having one face laying on or in contact with the rotary surface to circulate therebetween.

Figure 5:
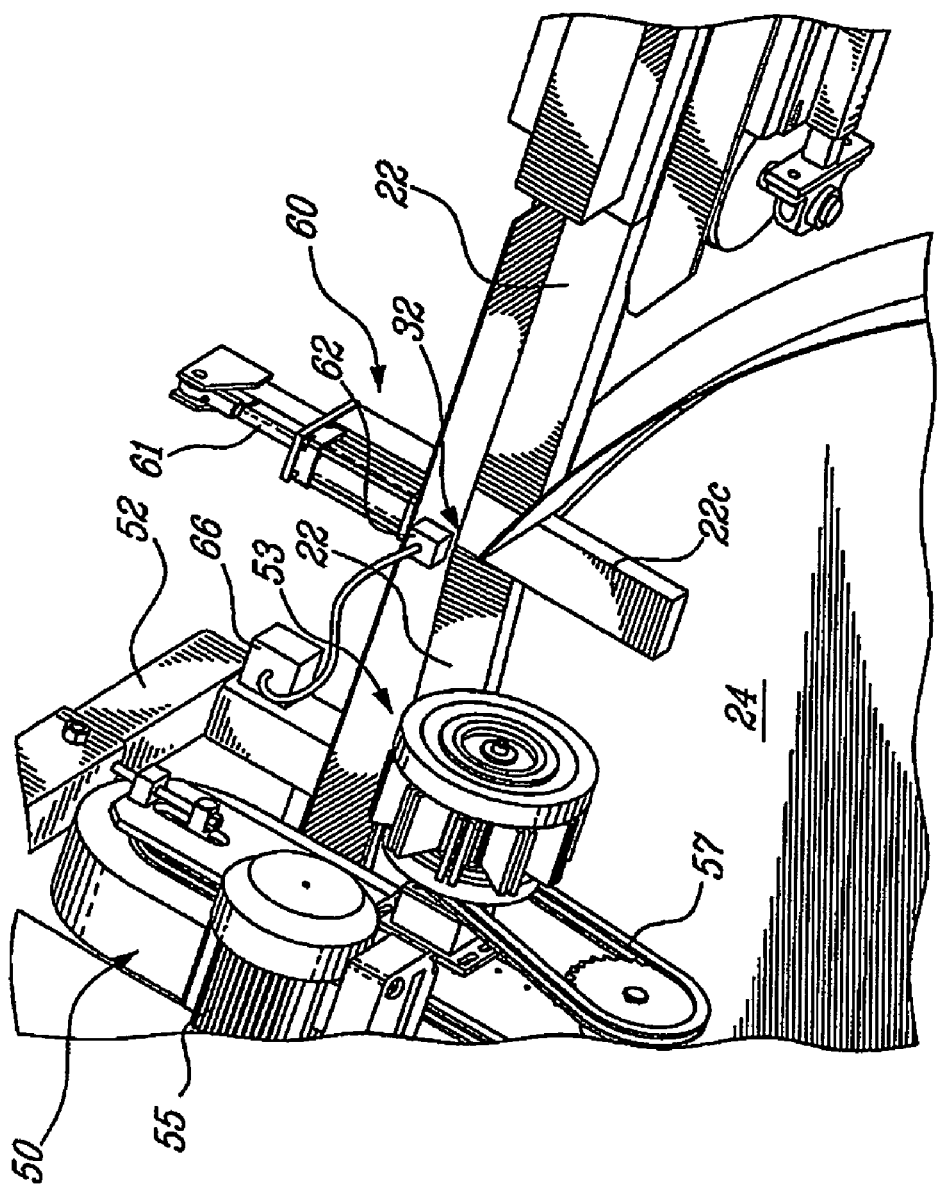
FIG. 5 is a perspective view, fragmented and enlarged, of a dislodging arm of the feeder shown in FIG. 1, in the retracted position.
Figure 6:
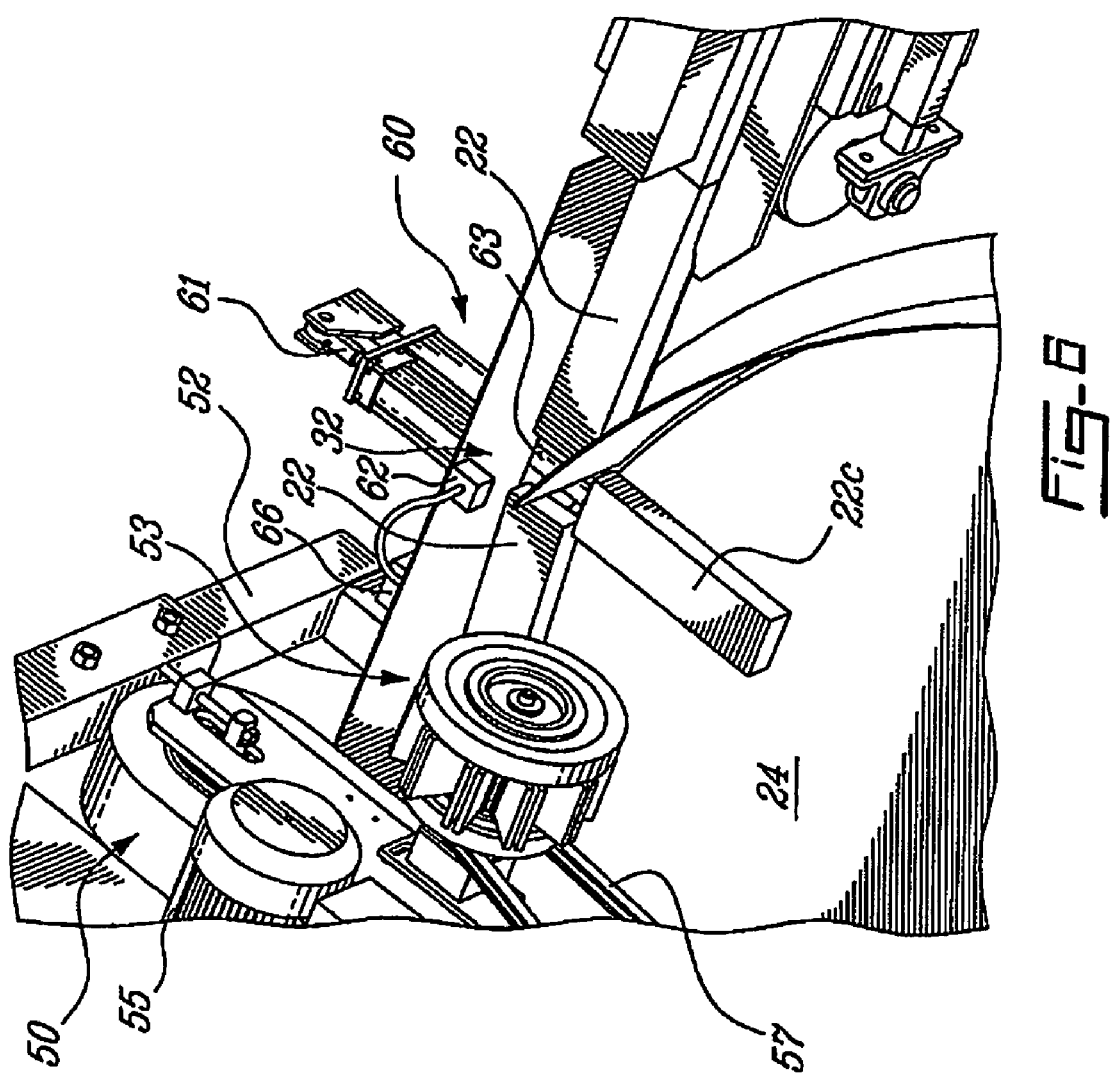
FIG. 6 is a perspective view, fragmented and enlarged, of the dislodging arm shown in FIG. 6, in the extended position.

If one block 22 gets jammed into the discharge aperture 32, several mechanisms can be used for dislodging the obstructing block 22c. Referring to FIGS. 5 and 6, it will be seen that the rotary table 20 can include a dislodging arm 60, or extendable arm, mounted proximate to the block discharge aperture 32, the dislodging arm 60 being movable between a retracted position (FIG. 5) and an extended position (FIG. 6) for dislodging the obstructing block 22c from the discharge aperture 32 by applying a force to the obstructing block 22c in the extended position. The actuator 61 for moving the dislodging arm 60 between the extended and retracted positions is preferably a linear actuator such as a pneumatic cylinder or any other linear actuator those known to those skilled in the art. The dislodging arm 60 can include an impacting element 63 such as a rod attached to the actuator 61.

In the retracted position, the dislodging arm 60 is preferably completely withdrawn from the rotary surface 24 and/or the discharge track 34 (FIG. 5) while in the extended position, at least a section of the dislodging arm 60 extends above the rotary surface 24 and abuts the obstructing block 22c for removing the obstructing block 22c from the discharge aperture 32 and moving it towards the center of the rotary surface 24 for being aligned (FIG. 6). As shown on FIGS. 5 and 6, the dislodging arm 60 is preferably mounted to the peripheral wall 30 proximate to the outer guide member 38.

The rotary table 20 can also include at least one sensor 62 conceived for detecting a presence of one block 22 proximate to or in the discharge aperture 32 and a controller 66 for calculating a duration of the presence of the block 22 in the discharge aperture 32. The duration of the presence of the block 22 in the discharge aperture 32 is compared by the controller 66 to a threshold duration. The threshold duration can be a maximum time of the presence of the block 22 in the discharge aperture 32 if the block 22 is not obstructing the discharge aperture 32. If the calculated duration is longer than the threshold duration, the dislodging arm 60 is actuated for moving from the retracted position to the extended position for abutting the block 22c obstructing the discharge aperture 32. The sensor can be positioned to detect blocks in the discharge aperture 32, on the carrier 42 extending after the discharge aperture 32, before the discharge aperture 32, or at any other appropriate location known to one skilled in the art that allows the detection of the obstruction of the discharge aperture 32. Once the obstructing block 22c is removed from the discharge aperture 32, the dislodging arm 60 is retracted into the retracted position (FIG. 5).

A second mechanism for dislodging the obstructing block 22 includes rotating the rotary surface 24 in the opposite rotation direction. As mentioned above, for aligning and widthdrawing the blocks 22 from the rotary surface 24, the rotary surface 24 is rotated in the direction of the discharge aperture 32, represented by arrow 48, a first rotation direction. The actuator 29 for rotating the rotary surface 24 is preferably conceived for rotating the rotary surface 24 in both directions, the first rotation direction, represented by arrow 48, and a second rotation direction, opposite to the first rotation direction. Therefore, if the block 22 obstructs the discharge aperture 32, the rotation direction of the rotary surface 24 can be reversed for one of a predetermined time period and a predetermined rotation distance sufficient for dislodging the obstructing block 22. Thereafter, if the block 22 has been dislodged from the discharge aperture 32, the rotation direction of the rotary surface 24 is reversed and the rotary surface 24 is rotated in the first rotation direction, represented by arrow 48.

The rotation speed of the rotary surface 24 in the second rotation direction can be slower or similar.

One skilled in the art will appreciate that both dislodging mechanisms described above can be combined for dislodging blocks 22 obstructing the discharge aperture 32.

The discharge aperture 32 is juxtaposed to the discharge track 34, which is followed by the first conveyor 42 which imparts to the blocks 22 traveling thereon a first traveling speed. Once past the discharge aperture 32, the aligned and oriented blocks 22 are queued waiting to be fed to other machineries. If the oriented and aligned blocks 22 need to be fed at a controlled rate and/or timing, several mechanisms, or block spacers, can be used for providing the spacing or time interval between two consecutive blocks 22.

Figure 7:
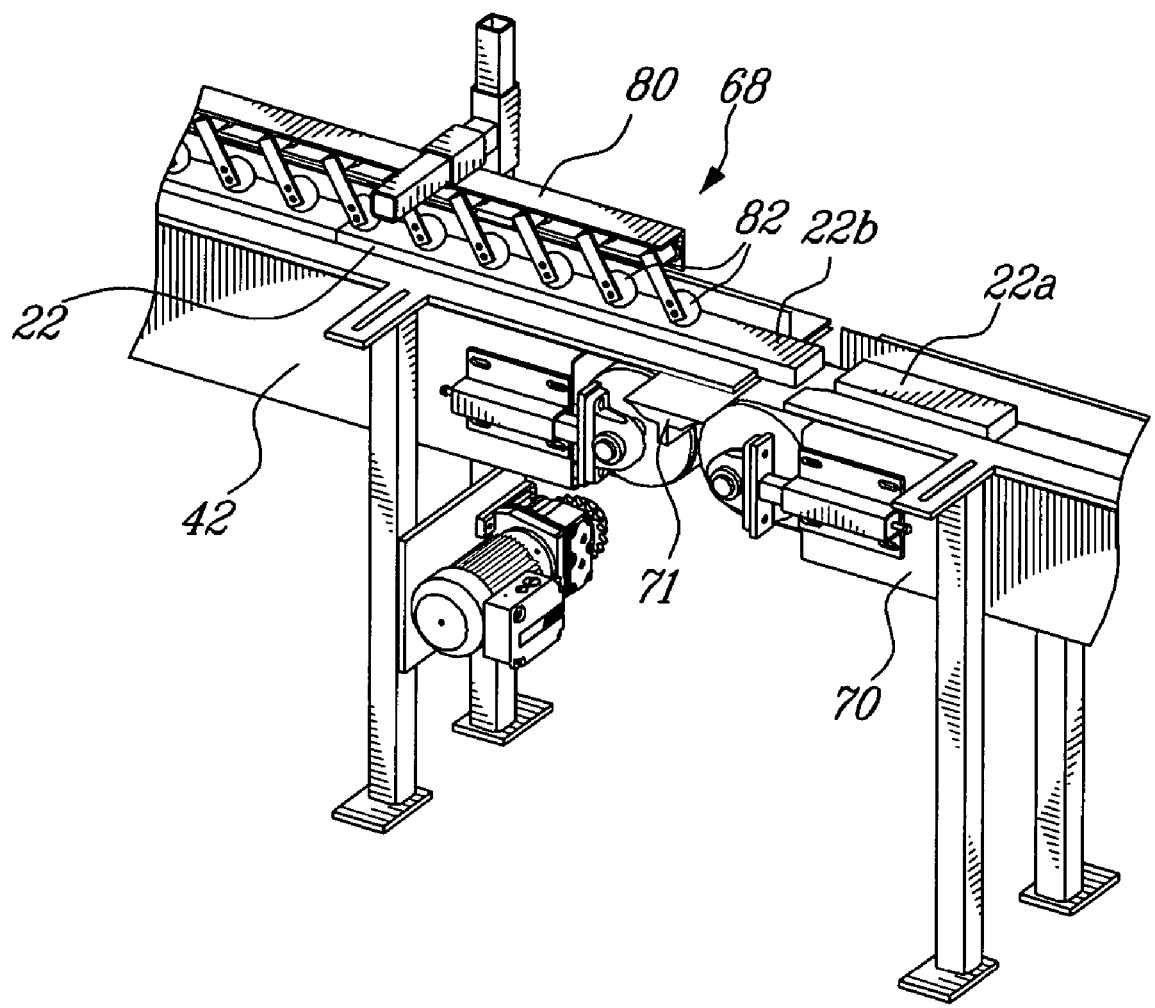
FIG. 7 is a perspective view of the block spacer shown in FIG. 1.

Referring to FIG. 7, it will be seen one block spacer 68 for providing the spacing or time interval between two consecutive blocks 22a, 22b. The first conveyor 42 is followed by a second conveyor 70 which imparts to the blocks 22 traveling thereon a second traveling speed. The blocks 22 carried by the first conveyor 42 are transferred to the second conveyor 70. The second traveling speed imparted by the second conveyor 70 is faster than the first traveling speed imparted by the first conveyor 42, thereby providing the spacing or the time interval between the two consecutive blocks 22a, 22b.

A bridging member 71 can be provided between the two conveyors 42, 70 for providing a smooth transfer of the blocks 22 from the first conveyor 42 to the second conveyor 70.

If a predetermined spacing or time interval is required between the two consecutive blocks 22a, 22b, the block spacer 68 can include a controller (not shown) for controlling the first and second traveling speeds.

An overhead member 80 can be mounted over the conveying surface of the first conveyor 42. The overhead member 80 applies a small pressure on the top surface of the blocks 22 for preventing the blocks 22 to flip upwardly if the number of blocks 22 withdrawn from the rotary table 20 is too important relative to the capacity of the block spacer 68 and the blocks 22 apply a pressure on one another. In the embodiment of FIG. 7, the overhead member 80 includes a plurality of idle rollers or wheels 82 press against the top surface of the blocks 22 carried by the first conveyor 42. The wheels 82 could also be driven. The wheels 82 apply a small pressure on the blocks 22 for transferring the traveling speed of the first conveyor 42 to the blocks 22b.

Figure 8:
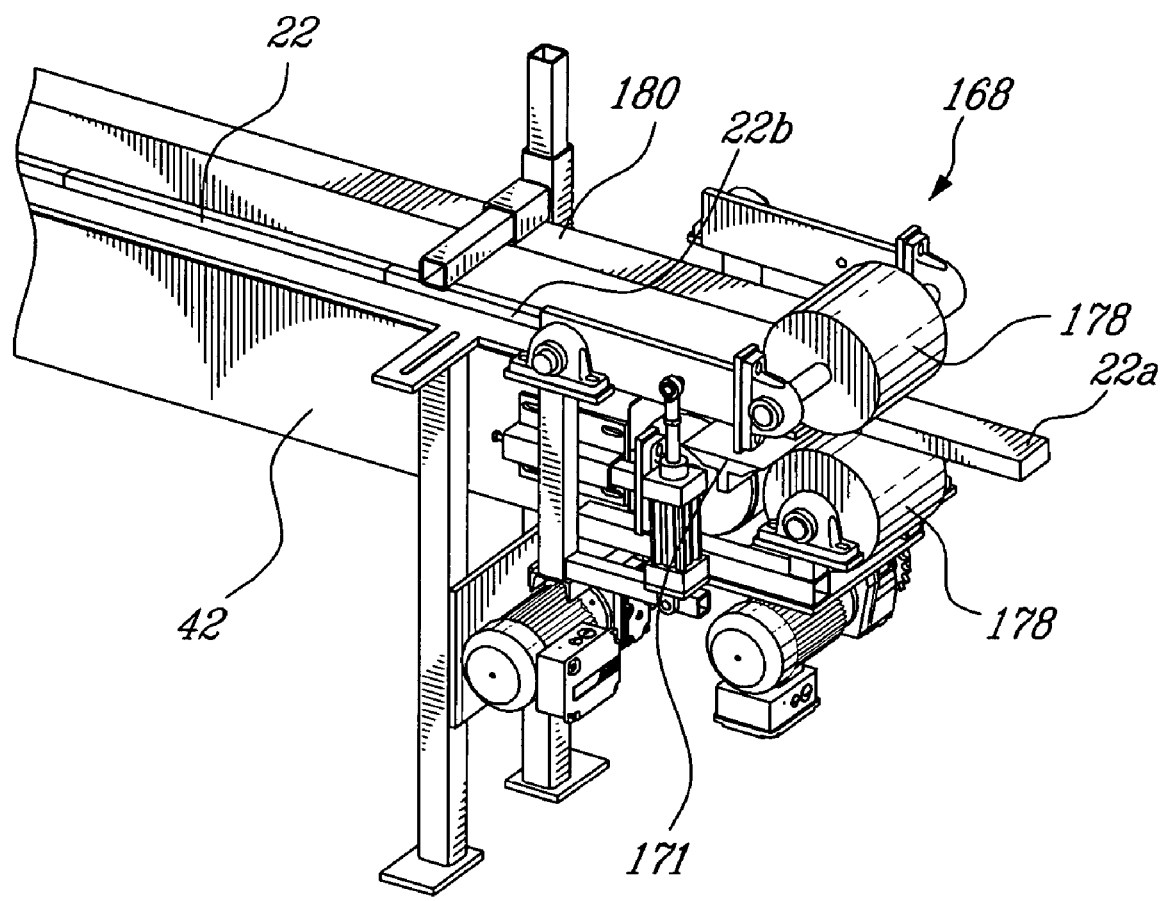
FIG. 8 is a perspective view of the block spacer in accordance with another embodiment of the invention, with feed rolls.

Referring to FIG. 8, there is shown another block spacer 168 for providing a spacing or time interval between two consecutive blocks 22a, 22b. The features are numbered with reference numerals which correspond to the reference numerals of the previous embodiment in the 100 series. The block spacer 168 includes two feed rolls 178 having a constant rotation speed. The feed rolls 178 convey the blocks 22a, 22b withdrawn to a second conveyor (not shown) or directly to a processing apparatus (not shown) that needs to be fed with blocks 22 at intervals. The feed rolls 178 convey the blocks 22 at a faster speed that the conveying or traveling speed imparted by the first conveyor 42.

The block spacer 168 can also include a controller (not shown) for controlling the rotation speed of the feed rolls 178 and the conveying speed of the second conveyor, if any, for providing one of a predetermined distance and a predetermined time lapse between the two consecutive blocks 22a, 22b.

Figure 9:
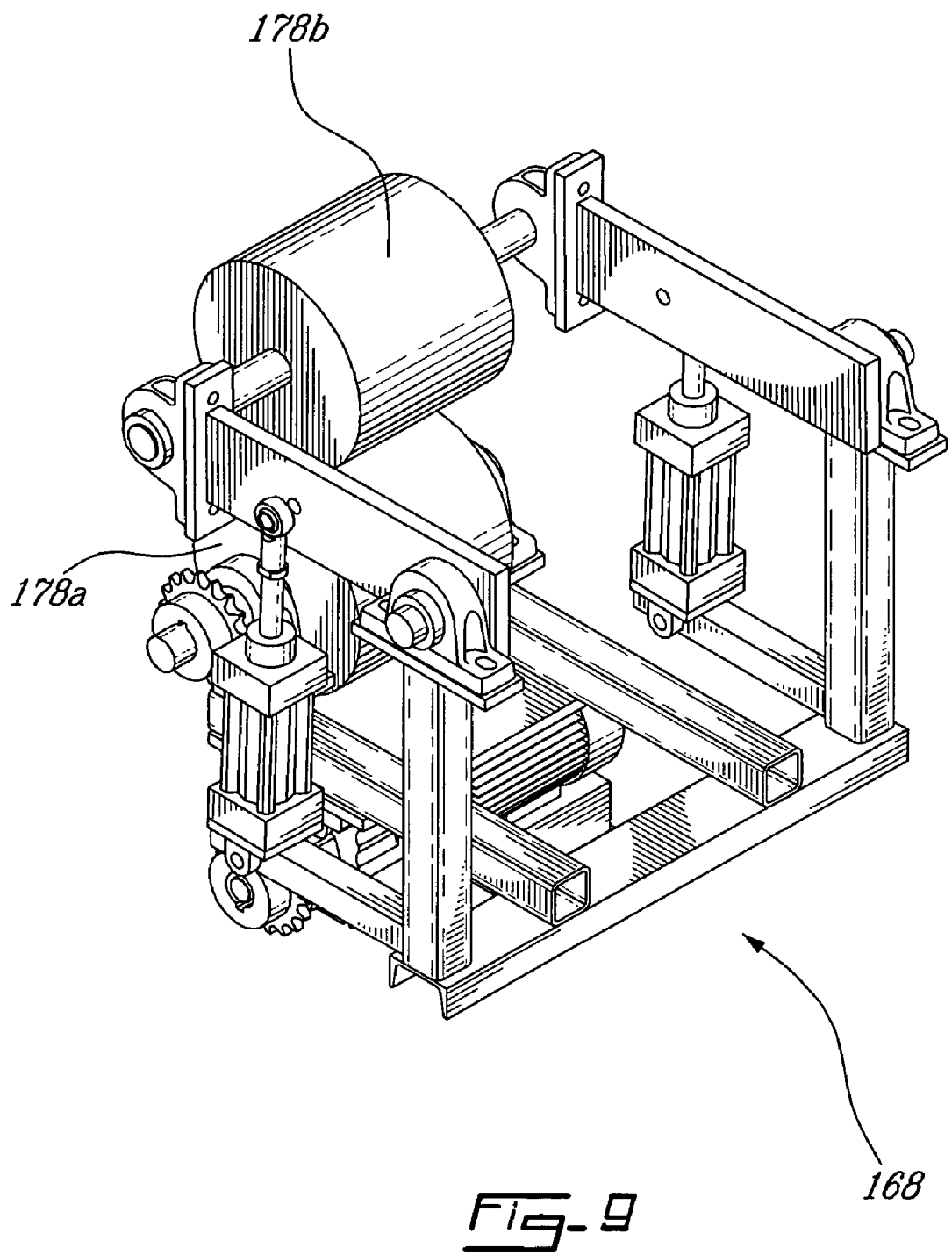
FIG. 9 is a perspective view of the feed rolls of the block spacer shown in FIG. 8.
Figure 10:
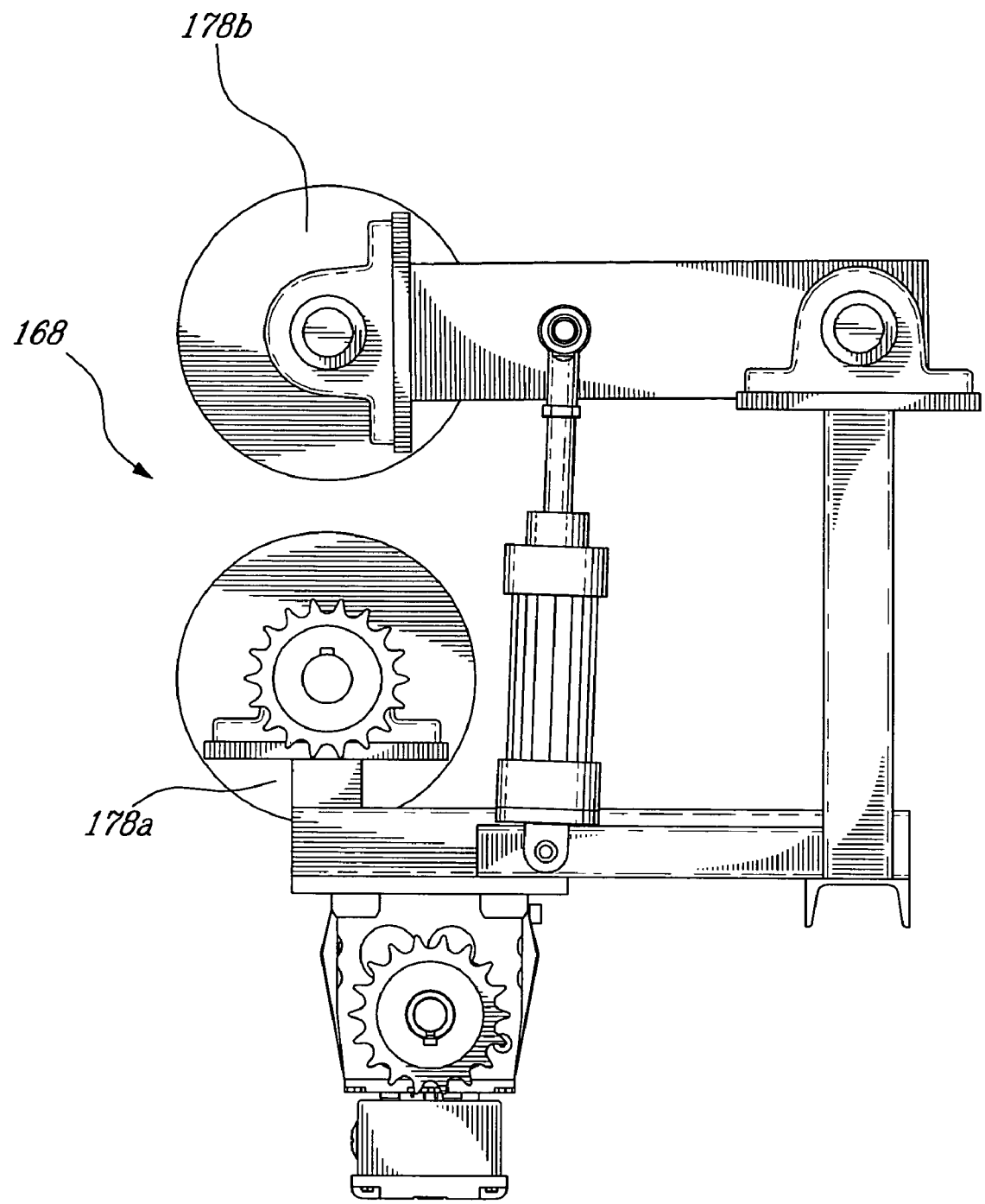
FIG. 10 is a side elevation view of the feed rolls of the block spacer shown in FIG. 8.

Referring to FIGS. 9 and 10, it will be seen that the blocks 22 (FIG. 8) are conveyed between both feed rolls 178. The spacing between the feed rolls 178 is preferably adjusted in accordance with the thickness of the blocks 22 carried. One skilled in the art will appreciate that the block spacer 168 can include only one feed roll 178 or one driven feed roll 178a and one idler feed roll 178b. Preferably, the lower feed roll 178a is the driven roll and the upper feed roll 178b is the idler roll but one skilled in the art will appreciate that both rolls 178a, 178b can be driven rolls. The upper feed roll 178b can have an adjustable height in a manner such that a low pressure is applied to the blocks 22 carried between the feed rolls 178.

Referring back to FIG. 8, it will be seen that, as for the block spacer 68, the block spacer 168 can include a bridging member 71 between the first conveyor 42 and the feed rolls 178 for providing a smooth transfer of the blocks 22 from the first conveyor 42 to the the feed rolls 178. A top guard 180 is mounted over the first conveyor 42. The top guard 180 is mounted above the blocks 22 conveyed by the first conveyor 42 and does not apply pressure on the blocks 22 carried by the conveyor 42 in normal operation. The top guard 180 is only abutted by the blocks 22 when they begin to flip upwardly. The top guard 180 acts as a security system.

The block spacer 168 shown in FIGS. 8 to 10 can be operated differently while still providing a spacing or time interval between two consecutive blocks 22a, 22b. The feed rolls 178 can be adapted to be in one of a rotating state and a stationary state. The feed rolls 178 are in the rotating state for conveying the blocks 22 to one of a second conveyor (not shown) or a processing apparatus (not shown) such as a finger jointer. The feed rolls 178 are in the stationary state for distancing the two consecutive blocks 22a, 22b. The relative duration of the state of the feed rolls 178 determines the spacing between the two consecutive blocks 22a, 22b. A servo-motor or any other appropriate actuator known to one skilled in the art can be used to drive the feed rolls 178.

If a predetermined spacing or time interval is required between the two consecutive blocks 22a, 22b, the block spacer 168 can include a controller (not shown) for controlling the state of the feed rolls 178.

Figure 11:
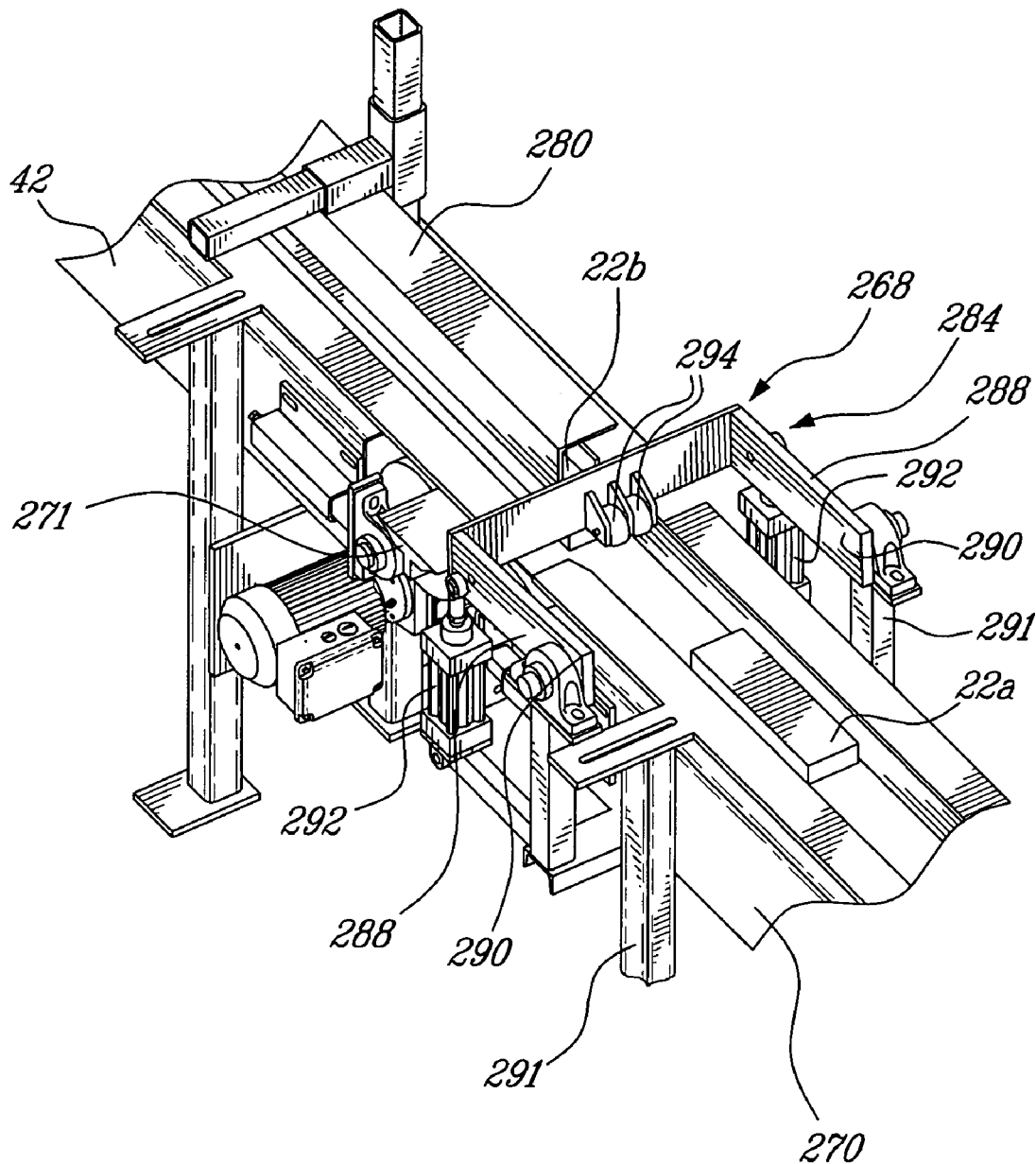
FIG. 11 is a perspective view of the block spacer in accordance with another embodiment of the invention.
Figure 12:
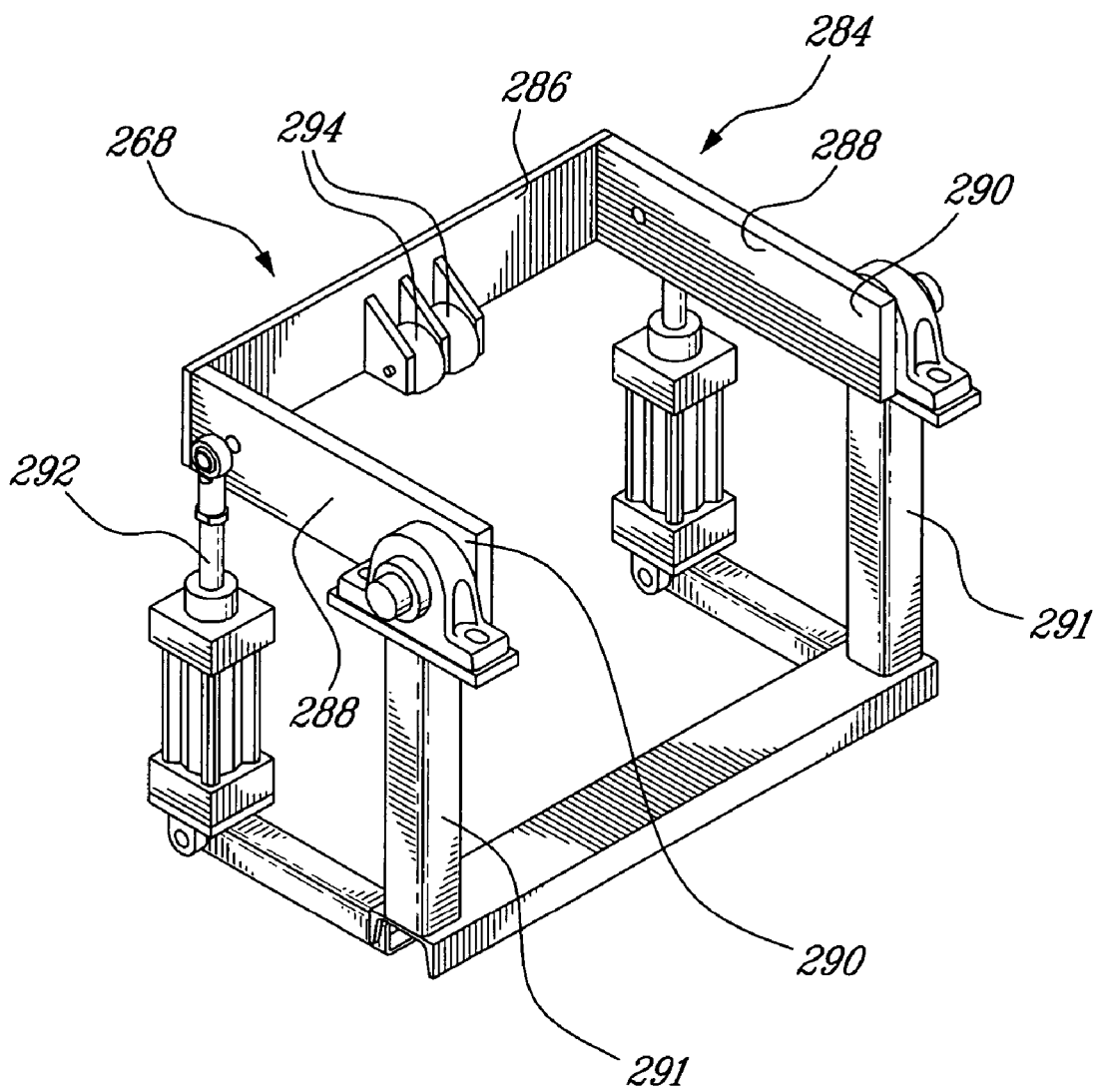
FIG. 12 is a perspective view of a barrier member of the block spacer shown in FIG. 11.
Figure 13:
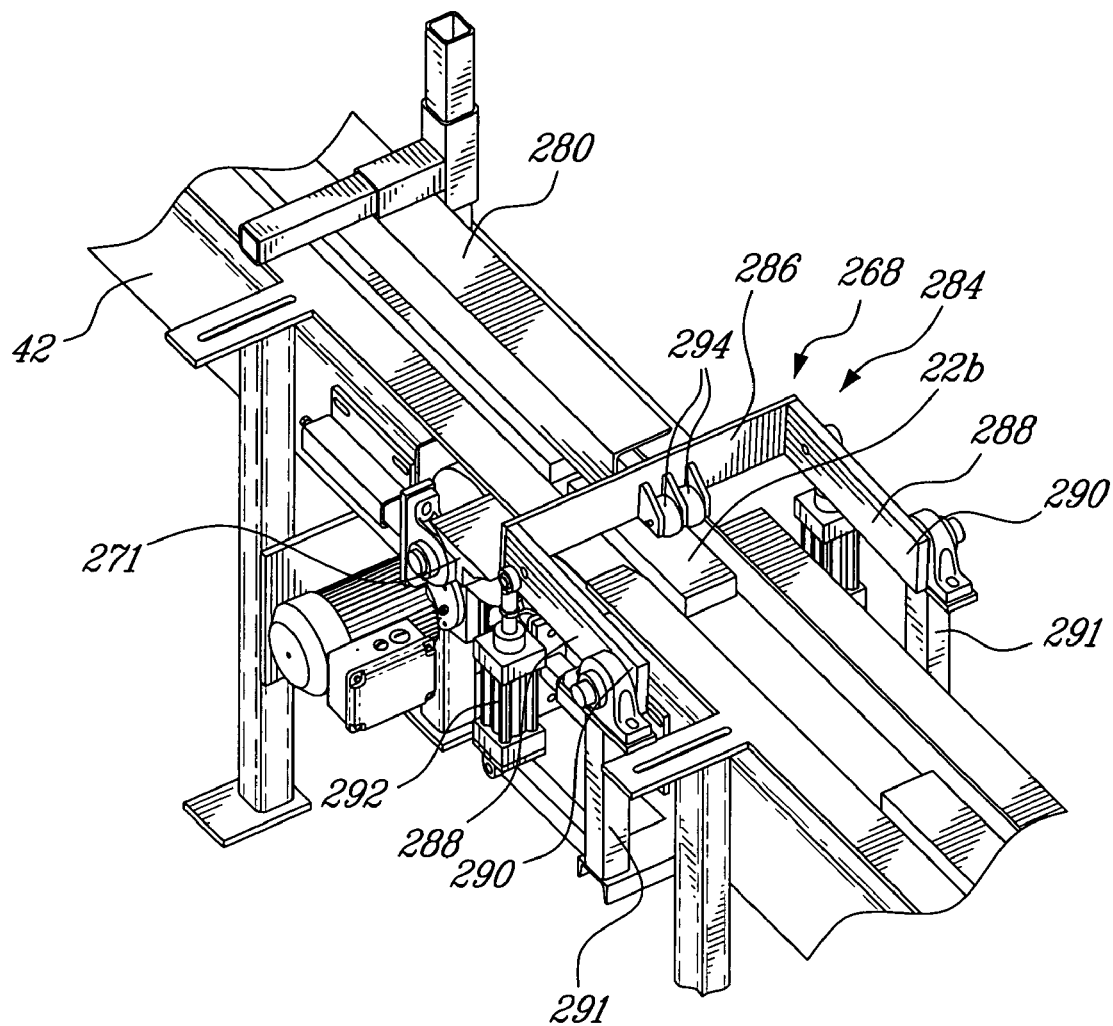
FIG. 13 is a perspective view of the barrier member of the block spacer shown in FIG. 11 with the barrier member abutting one block.

Referring to FIGS. 11 to 13, it will be seen another block spacer 268 for providing a spacing or time interval between two consecutive blocks 22a, 22b. The features are numbered with reference numerals which correspond to the reference numerals of the previous embodiments in the 200 series. The first conveyor 42 is followed by a second conveyor 270. The block spacer 268 also includes a barrier member 284 disposed between the first and the second conveyors 42, 270. The barrier member 284 is movable between a closed position preventing the passage of the blocks 22 from the first conveyor 42 to the second conveyor 270 and an open position allowing the passage of the blocks 22 from the first conveyor 42 to the second conveyor 270.

The barrier member 284 of the block spacer 268 has substantially a U-shape with a central member 286 and two legs 288 extending from a respective end of the central member 286. The free ends 290 of both legs 288 are pivotally mounted two support members 291, disposed on a respective side of the second conveyor 270, however one skilled in the art will appreciate that they can be mounted on a respective side of the first conveyor 42. Two extendable arms 292, such as linear actuators, are secured on a respective leg 288, proximate to the junction with the central member 286. The extendable arms 292 move between an extended position wherein the barrier member 284 is in the open position and a retracted position wherein the barrier member 284 is in the closed position. One skilled in the art will appreciate that any mechanism allowing the barrier member 284 to move between the open and the closed positions can be used such as pneumatic cylinders, hydraulic cylinders, electric solenoids, cam, crankshaft, and the like. Only one extendable arm 292 can be used. Moreover, the structure of the barrier member 284 and its mechanism can differ from the one shown in FIGS. 11 to 13 and described above.

Two abutting wheels 294 are rotatably mounted to the central member 286 of the barrier member 284. As shown on FIG. 13, the abutting wheels 294 of the barrier member 284 abut the block 22b being transferred from the first conveyor 42 to the second conveyor 270. The abutting wheels 294 apply a small pressure on the block 22b for transferring the speed of the second conveyor 270, which is faster than the speed of the first conveyor 42, to the block 22b. The small pressure applied by the wheels 294 to the blocks 22b closes the barrier member 284 closes when the whole block 22b is transferred to the second conveyor 270, thereby preventing the following block 22 to be transferred to the second conveyor 270.

As for the previous block spacers 68, 168, the block spacer 168 can include a bridging member 271 between the first conveyor 42 and the second conveyor 270 for providing a smooth transfer of the blocks 22 from the first conveyor 42 to the the second conveyor 270. An top guard 280, similar to the top guard 180, is mounted over the first conveyor 42.

The block spacer 268 can also include a controller (not shown) for controlling the movement of the barrier member 284 between the open and the closed positions and/or the speed of the second conveyor 270 for providing one of a predetermined distance and a predetermined time lapse between the two consecutive blocks 22a, 22b.

The combination of the rotary table 20, and the block spacers 68, 168, 268 permits to orient and align elongaged blocks 22 from a disorderly supply and to feed the oriented and aligned blocks 22 at controlled intervals to another processing apparatus such as a wood working machine such as finger jointers, a scanning equipment and the like.

The blocks 22 can be wood blocks, plastic blocks or any other blocks that need to be oriented and aligned. The wood blocks can need to be aligned and oriented for feeding wood working machines such as finger jointers or scanning equipment, for instance. The blocks 22 can be elongated blocks having preferably a length longer than the thickness and the width. One skilled in the art will appreciate that short items can also be aligned and oriented with the above described apparatus.

The rotary table 20 and the block spacers 68, 168, 268 combined with the means for disloging obtrusting blocks 22 from the discharge aperture 32 are adapted for blocks having a random length distribution.

The feeder or the rotary table 20 described above allows to orient and aligned items having a length distribution. The probabilities of block wedging at the discharge aperture 32 are reduced because the block piles are destroyed upstream the discharge aperture 32 and the misaligned blocks are removed from the discharge aperture 32.

The blocks obstruct the discharge aperture 32, automated mechanisms are available for dislodging an obstruing block 22 from the discharge aperture 32. Moreover, it is possible to automatically space consecutive blocks 22a, 22b withdrawn from the rotary table 20.

In the wood industries, the aligned and oriented blocks 22 can be transferred or fed to wood working machines or scanning equipment, for instance.

The feeder allows to achieve high feed rates with a minimum or no human intervention.

The embodiments of the invention described above are intended to be exemplary only. One skilled in the art will appreciate that the discharge aperture 32 can be directly followed by the first conveyor 42 instead of being followed by the discharge track 34. One skilled in the art will appreciate that the first and second conveyors 42, 70, 270 can be replaced by any appropriate block carrier. The scope of the invention is therefore intended to be limited solely by the scope of the appended claims.

What is claimed is:

1. A feeder for orienting and aligning disorderly incoming articles, comprising:
a table having a peripheral wall, a rotary surface surrounded by the peripheral wall, and a discharge substantially tangential to the peripheral wall, the discharge being sized to receive one article at a time from the rotary surface in a predetermined orientation; and
at least one longitudinal brush conveyor with bristles extending above the rotary surface, having a rotation axis substantially parallel to the rotary surface, being rotatable in a direction bringing the articles towards the center of the rotary surface, away from the peripheral wall, and defining a gap therewith, the gap being sized to solely permit passage of non-superposed articles.

2. A feeder as claimed in claim 1, wherein the articles in the discharge aperture have a face in contact with the rotary surface and the gap is sized to solely permit passage of articles having the face in contact with the rotary surface.

3. A feeder as claimed in claim 1, comprising at least two longitudinal brush conveyors and at least one of the at least two longitudinal brush conveyors is mounted proximate to the discharge, upstream therefrom.

4. A feeder as claimed in claim 1, comprising a rotary brush disposed over the rotary surface, the rotary brush being spaced from the peripheral wall by a distance sufficient to permit only articles in the predetermined orientation to circulate therebetween, the rotary brush being rotated in a direction dislodging the articles not in the predetermined orientation.

5. A feeder as claimed in claim 4, wherein the rotation axis of the rotary brush is substantially parallel to the rotary surface.

6. A feeder as claimed in claim 1, comprising a carrier disposed proximate to the discharge, the carrier withdrawing, from the table, the articles introduced into the article discharge.

7. A feeder as claimed in claim 1, wherein the articles are elongated wood blocks with a length distribution.

8. A method for orienting and aligning disorderly incoming articles, comprising:
feeding a rotary surface with the articles;
driving the rotary surface to carry the articles to a discharge aperture defined in a peripheral wall surrounding the rotary surface, the discharge aperture being configured to only permit passage of one properly oriented article at a time;
eliminating article piles on the rotary surface proximate to the peripheral wall;
displacing with a rotary misaligned article eliminating member, spaced apart from the peripheral wall, articles not in the predetermined orientation towards the center of the rotary surface, away from the peripheral wall; and
individually withdrawing properly oriented articles from the rotary surface through the discharge aperture.

9. A method as claimed in claim 8, comprising displacing the articles on the rotary surface for eliminating article piles on the rotary surface.

10. A method as claimed in claim 9, comprising brushing the articles in a direction bringing the articles towards the center of the rotary surface, away from the peripheral wall.

11. A method as claimed in claim 9, comprising brushing the articles with at least one longitudinal brush conveyor including an endless belt covered with stiff bristles.

12. A method as claimed in claim 8, comprising brushing with the rotary misaligned article eliminating member the articles not in the predetermined orientation towards the center of the rotary surface, away from the peripheral wall.

13. A feeder for aligning and orienting disorderly incoming items, comprising:
a table having a peripheral wall, a rotary surface surrounded by the peripheral wall, and a discharge substantially tangential to the peripheral wall, the discharge being sized to receive one item at a time and in a predetermined orientation; and
at least one dislodging arm disposed proximate to the discharge, the dislodging arm being movable between a retracted position and an extended position, the dislodging arm, when deployed to the extended position thereof, dislodging obstructing items from the discharge and pushing the items towards the center of the rotary surface, away from the discharge, thereby permitting oriented items to be received in the discharge to be withdrawn from the table.

14. An aligning and orientating apparatus as claimed in claim 13, comprising at least one sensor detecting a presence of an item at a predetermined location.

15. An aligning and orientating apparatus as claimed in claim 14, a controller calculating a duration of the presence of the item at the predetermined location and comparing the duration to a threshold duration wherein the threshold duration is a maximum time of the presence of the item at the predetermined location if the item is not obstructing the discharge.

16. An aligning and orientating apparatus as claimed in claim 15, comprising at least one linear actuator operatively connected to the at least one dislodging arm, the at least one linear actuator moving the at least one dislodging arm between the retracted position and the extended position, if the calculated duration is longer than the threshold duration.

17. An aligning and orientating apparatus as claimed in claim 13, comprising pile eliminating member extending above the rotary surface and defining a gap therewith, the gap being sized to solely permit passage of non-superposed items laying on the rotary surface.

18. An aligning and orientating apparatus as claimed in claim 13, comprising a rotary brush disposed over the rotary surface, the rotary brush being spaced from the peripheral wall by a distance sufficient to permit only items in the predetermined orientation to circulate therebetween, the rotary brush being rotated in a direction displacing the items not in the predetermined orientation towards the center of the rotary surface.

19. A method for orienting and aligning disorderly incoming items, comprising:
feeding a rotary surface having a first rotation direction with the items;
driving the rotary surface in rotation;
aligning the items substantially tangential to a wall disposed at the periphery of the rotary surface;
withdrawing the items aligned in a predetermined orientation from the rotary surface through a discharge aperture in the peripheral wall;
detecting a presence of an item at a predetermined location;
calculating a duration of the presence of the item at the predetermined location;
comparing the duration to a threshold duration wherein the threshold duration is a maximum time of the presence of the item at the predetermined location and after which the item is considered as obstructing the discharge aperture; and
extending an extendable arm through the discharge aperture, if the calculated duration is longer than the threshold duration, the extendable arm in the extended position abutting the item obstructing the discharge aperture and pushing the item towards the center of the rotary surface, away from the discharge aperture.

20. A method as claimed in claim 19, comprising rotating the rotary surface in a second rotation direction opposite to the first rotation direction for one of a predetermined time period and a predetermined rotation distance, if the calculated duration is longer than the threshold duration, for dislodging the item obstructing the discharge aperture.

21. A method as claimed in claim 19, comprising displacing the items not aligned in the predetermined orientation proximate to the discharge aperture towards the center of the rotary surface.

22. A method as claimed in claim 19, wherein the items are elongated wood blocks with a length distribution.

23. A feeder for orienting and aligning disorderly incoming articles, comprising:
- a table having a peripheral wall, a rotary surface surrounded by the peripheral wall, and a discharge substantially tangential to the peripheral wall, the discharge being sized to receive one article at a time from the rotary surface in a predetermined orientation;
- at least one pile eliminating member extending above the rotary surface and defining a gap therewith, the gap being sized to solely permit passage of non-superposed articles; and
- a rotary misaligned article eliminating member disposed over the rotary surface, spaced from the peripheral wall by a distance sufficient to permit only articles in the predetermined orientation to circulate therebetween, and rotatable in a direction dislodging the articles not in the predetermined orientation.

24. A feeder as claimed in claim 23, wherein the at least one pile eliminating member comprises a longitudinal brush conveyor and is rotatable in a direction bringing the articles towards the center of the rotary surface, away from the peripheral wall.

25. A feeder as claimed in claim 23, wherein the rotary misaligned article eliminating member comprises a rotary brush mounted proximate to the at least one pile eliminating member, the rotary brush having a rotation axis substantially parallel to the rotary surface.

* * * * *